United States Patent [19]
Atherton

[11] 3,973,864
[45] Aug. 10, 1976

[54] TIDE MOTOR

[76] Inventor: Dewitt T. Atherton, 407 West E. St., Encinitas, Calif. 92024

[22] Filed: Jan. 24, 1975

[21] Appl. No.: 543,685

[52] U.S. Cl. .................................. 415/8; 415/61; 415/140; 416/128
[51] Int. Cl.² ...................... F03B 7/00; F03B 13/12
[58] Field of Search .................. 415/8, 61; 60/398; 417/330, 334, 336; 416/111, 119, 128, 120; 290/53, 54

[56]           References Cited
          UNITED STATES PATENTS

| | | | |
|---|---|---|---|
| 376,357 | 1/1888 | Weeks | 415/140 |
| 487,381 | 12/1892 | Suter | 416/128 |
| 653,047 | 7/1900 | Werner | 416/120 |
| 958,467 | 1/1910 | Bennett | 415/8 |

*Primary Examiner*—Carlton R. Croyle
*Assistant Examiner*—L. J. Casaregola
*Attorney, Agent, or Firm*—Ralph S. Branscomb

[57] ABSTRACT

A wave motor is comprised of two or more parallel rotors having apertured radial paddle elements with hinged flaps or blades covering the apertures such that upon the impingement of water upon one side of the paddles the blades cover the apertures and the wheel is turned, but upon impingement of water against the other side of the paddles the blades swing open. Each pair of rotors are coaxially mounted and designed for rotation in opposite directions to maximize extracted power regardless of the predominant current direction, and a single take off shaft is coupled to the rotors through a ratchet and gear mechanism.

1 Claim, 3 Drawing Figures

TIDE MOTOR

BACKGROUND OF THE INVENTION

Numerous water wheels and rotors have been developed for use in streams incorporating various hinged flap arrangements to cause the wheel to rotate in one direction only and minimize counter forces due to reverse relative currents. Because these units were designed to be used in streams and rivers wherein the prevailing current is always in the same direction, none of the horizontal-axled wheels are designed to effectively extract power from the water regardless of the direction of the prevailing current, which would be necessary in the event of employment of the units in a tide-water environment.

SUMMARY OF THE INVENTION

The present invention is designed particularly for use in tidewater and surf zones, and includes two wheels or rotors which rotate in opposite directions from one another so that regardless of the direction of tide flow maximum power is extracted from the water. Each of the rotors is provided with radial paddles having apertures covered by hinged flaps or blades which open to feather through the water when a reverse current condition occurs at a particular aperture. The two rotors each have a separate axle and each axle is provided with a ratchet wheel rigidly mounted thereon and a bevel gear journalled on the axle adjacent the ratchet wheel, and a pawl is mounted on each gear to engage the ratchet so that the gear can be turned in one direction only by the axle, and a power take off shaft is provided with a bevel gear which engages the two axle gears.

DETAILED DESCRIPTION OF THE PREFERRED EMBODIMENT

Figure 2:
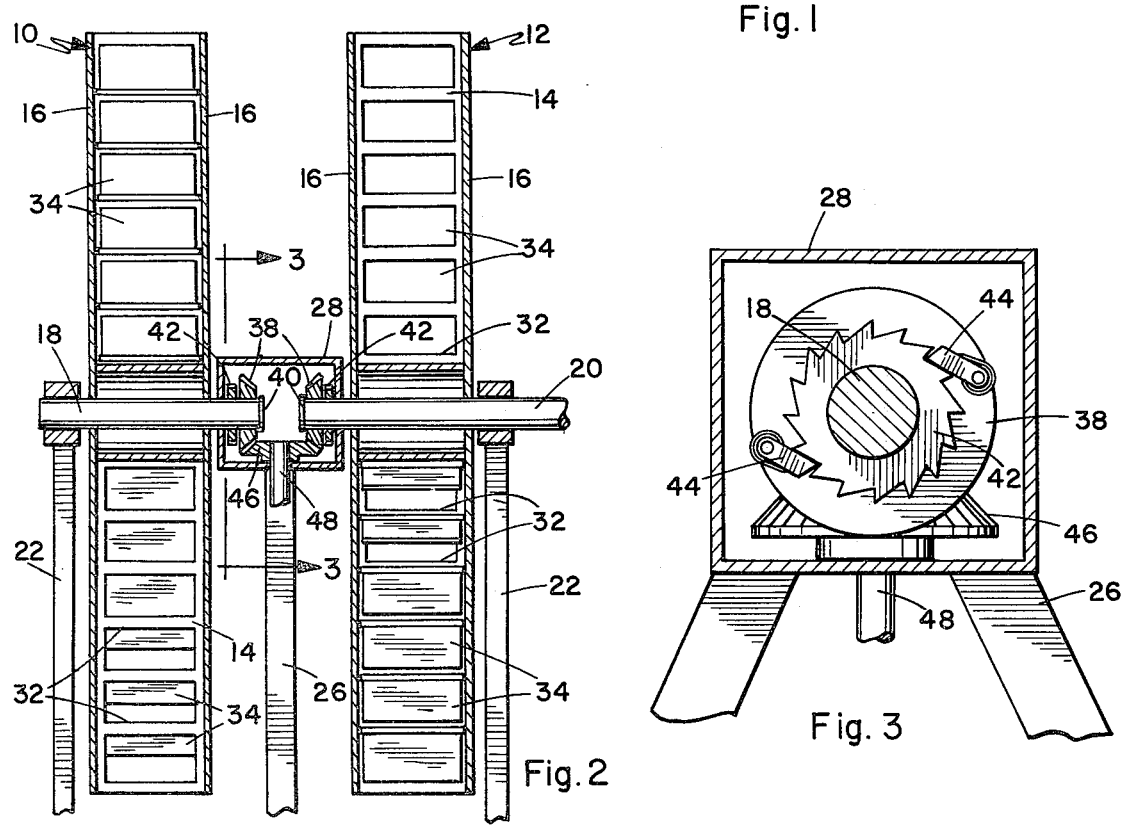
FIG. 2 is a sectional view taken on line 2—2 of FIG. 1.

The invention is intended to be used in a coastal off-shore or tideland area and comprises a pair of rotors 10 and 12 which are identical except that they are designed to rotate in opposite directions. The rotors are provided with a plurality of radially extended paddle elements 14 which are preferably mounted between two side discs 16. Each rotor has a separate axle indicated at 18 and 20, the latter being shown as broken away at the right hand end in FIG. 2 to indicate that an additional rotor which would be part of another pair could be installed so that a series of the rotor pairs could be used.

The axles are journalled at their outer portions in support stanchions 22 which are suitably anchored to the ocean floor in a concrete base 24 or the like. The inner ends of the axles are journalled in a suitable bearing means on stanchions 26, the bearing means disgrammatically shown in FIG. 2 being simply openings in the walls of a gear box 28. The height of the rotors in the water 30 should be such that the axles are approximately at the means high tide line, the size of the structure being such that substantial portions of the rotors are submerged even at low tide.

Figure 3:
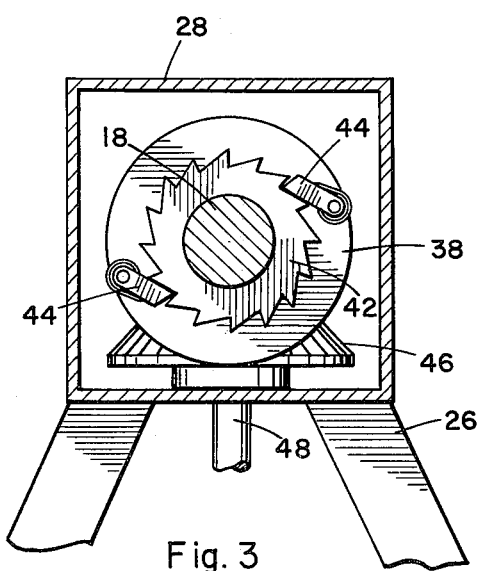
FIG. 3 is an enlarged sectional view taken on line 3—3 of FIG. 2.

The paddles 14 are provided with a series of closely spaced apertures 32, and each aperture has an associated blade 34 which is hinged as at 36 to the paddle at the radially inner edge of the paddle so that gravity tends to hold the blades down against, or in proximity to, the apertures on the lower half of each rotor. The blades on each individual rotor are hinged to the same angular side of each paddle, and the blades on each one of the rotors are hinged on the opposite angular sides of the paddles from the other rotor so that the rotors turn in opposite directions when exposed to coastwise currents as is detailed hereinafter. With initial reference to FIG. 3, the inner ends of the axles 18 and 20 each have a bevel gear 38 journalled thereon which is sandwiched between an end flange 40 and a ratchet wheel 42, both of which are non-rotatable relative to the axles. Each of the bevel gears is provided with a spring-loaded pawl 44, the ratchet and pawl arrangements on the separate axles being such that the bevel gears are rotated by the shafts in opposite directions. A third bevel gear 46 is journalled in the gear box 28 and engages both of the gears 38. This gear is mounted on a power take-off shaft 48 which delivers power to any utilization means, such as an electric generator. Clearly the shaft 48 and the gear 46 could be disposed at the top of the gears 38 or at any other suitable position.

Figure 1:
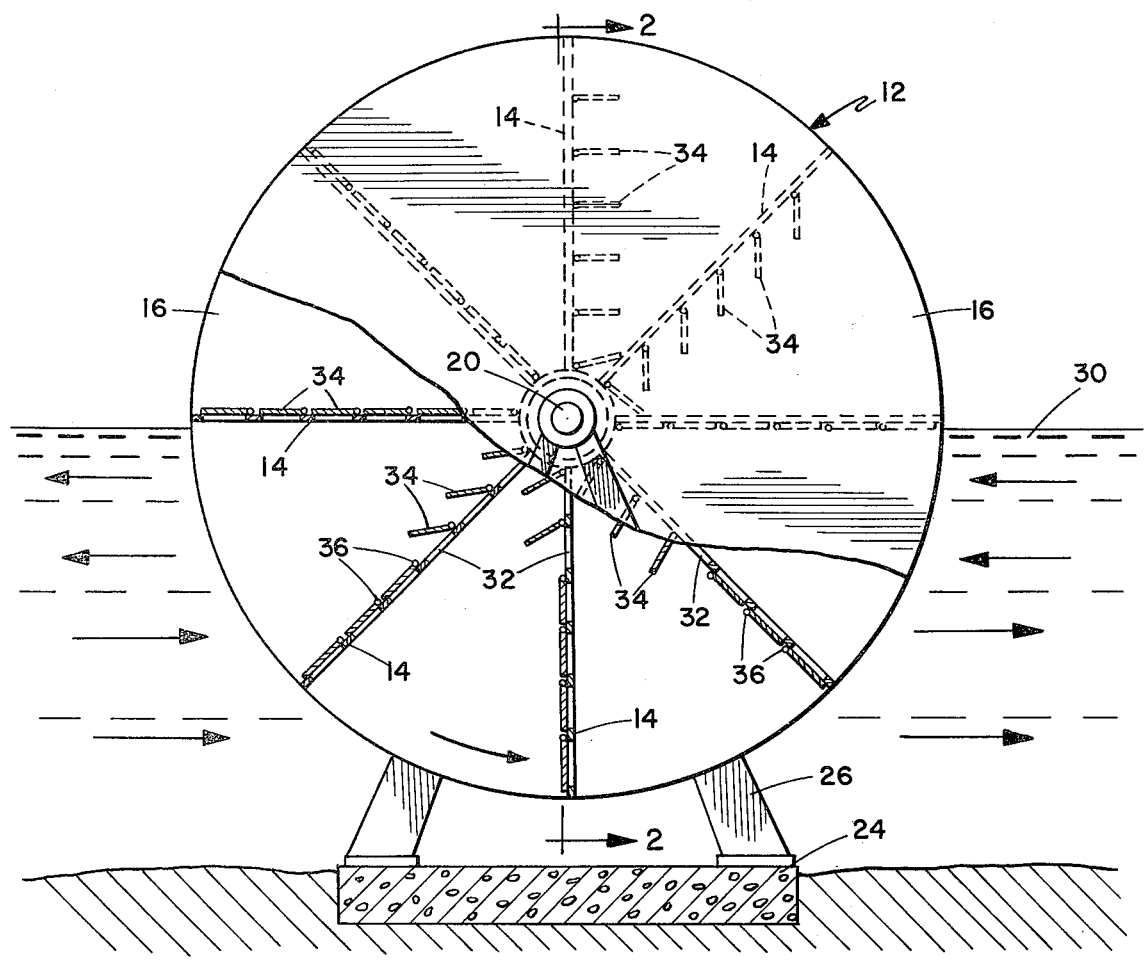
FIG. 1 is a side elevation view, partially cut away, of the apparatus.

In the operation of the motor, each of the rotors will have the lower half or a substantial portion thereof submerged as illustrated in FIG. 1. Each rotor is structured to revolve in one direction only, determined by the angular side of the paddles on which the blades are hinged, so that the rotor 12 in FIG. 1 obviously will turn counter clockwise and the rotor 10 will rotate clockwise. A condition in which the water is moving in opposite direction at different levels, or an undertow condition, represented by the arrow in FIG. 1, will not significantly slow the rotor due to the swinging blade action.

The ratchet wheels 42 on the rotor axles will only engage the pawls 44 and thus turn the bevel gears 48 when the rotors are turning the proper direction. Additionally, the ratchet arrangment permits the faster rotor to drive the common gear 46 without driving the slower rotor along with it, which is clearly advantageous inasmuch as a principal direction of flow will generally exist and the rotors will be moving at different speeds. The power take off and gearbox are therefore disposed between the rotors rather than at the outside end of one axle so that this independant action can be effected without the use of a double, coaxial axle arrangement for one of the rotors which would otherwise be necessary.

If of suitable rugged construction, the above described water powered motors should produce considerable power over a long period of time without requiring any significant maintenance.

I claim:

1. A wave motor comprising:
   a. a pair of rotors having spaced coaxial axles;
   b. each of said rotors having a plurality of radially extended paddle elements and each of said paddle elements being provided with a plurality of apertures;
   c. each of said apertures having a blade dimensioned to cover same and hingedly connected to the respective paddle adjacent the respective aperture and radially inwardly thereof;

d. all of the blades of one of said rotors being hinged to one angular side of the paddle elements and all of the blades of the other of said rotors being hinged to the opposite angular side of the paddles opposite;

e. each of said axles having one end thereof adjacent the other of said axles and each of these adjacent ends having a bevel gear journalled therein;

f. a power take-off shaft disposed between said rotors and perpendicular to the axles thereof and having a bevel gear engaging the bevel gear on said axles; and g. each of said axles having a right ratchet wheel mounted thereon adjacent the bevel gear thereon, and each of the bevel gears on said axles having a pawl engaging the respective ratchet wheel such that each ratchet wheel engages the respective pawl when the rotor on the respective axle is turning in the angular direction opposite to the angular side to which the blades thereon are attached, whereby said power take-off shaft will be activated by one of said rotors when turning in one direction and the other of said rotors when turning in the opposite direction.

* * * * *